United States Patent
Clear et al.

(10) Patent No.: US 11,124,933 B2
(45) Date of Patent: Sep. 21, 2021

(54) PAVEMENT MARKING SYSTEM FOR LANE IDENTIFICATION

(71) Applicant: 3M INNOVATIVE PROPERTIES COMPANY, St. Paul, MN (US)

(72) Inventors: Susannah C. Clear, Hastings, MN (US); Thomas P. Hedblom, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 88 days.

(21) Appl. No.: 16/493,660

(22) PCT Filed: Mar. 14, 2018

(86) PCT No.: PCT/IB2018/051704
§ 371 (c)(1),
(2) Date: Sep. 12, 2019

(87) PCT Pub. No.: WO2018/167688
PCT Pub. Date: Sep. 20, 2018

(65) Prior Publication Data
US 2020/0011018 A1 Jan. 9, 2020

Related U.S. Application Data

(60) Provisional application No. 62/471,764, filed on Mar. 15, 2017.

(51) Int. Cl.
*G06K 9/00* (2006.01)
*G06K 9/46* (2006.01)
(Continued)

(52) U.S. Cl.
CPC ............... *E01F 9/582* (2016.02); *E01F 9/576* (2016.02); *G06K 9/00798* (2013.01); *G06K 9/4652* (2013.01); *G06K 9/4661* (2013.01)

(58) Field of Classification Search
None
See application file for complete search history.

(56) References Cited

U.S. PATENT DOCUMENTS

| | | | |
|---|---|---|---|
| 4,970,653 A | 11/1990 | Kenue | |
| 5,006,010 A | * 4/1991 | Duckett | E01F 9/553 404/12 |

(Continued)

FOREIGN PATENT DOCUMENTS

| | | |
|---|---|---|
| CN | 102346481 | 2/2012 |
| CN | 106245475 | 12/2016 |
| WO | WO 2011-106578 | 9/2011 |

OTHER PUBLICATIONS

International Search Report for PCT International Application No. PCT/IB2018/051704, dated Jun. 4, 2018, 5 pages.

*Primary Examiner* — Idowu O Osifade
(74) *Attorney, Agent, or Firm* — Carlos M. Téllez Rodríguez; 3M Innovative Properties Company

(57) ABSTRACT

The disclosed pavement marking system provides information about the arrangement of the pavement marking to a sensor on a vehicle for to identify a particular lane on a roadway. The pavement marking system comprises a sensor placed on a vehicle and at least a first pavement marking and a second pavement marking, wherein each of the first pavement marking a second pavement marking comprising different properties.

20 Claims, 2 Drawing Sheets

(51) Int. Cl.
*E01F 9/582* (2016.01)
*E01F 9/576* (2016.01)

(56) References Cited

U.S. PATENT DOCUMENTS

| | | |
|---|---|---|
| 5,750,191 A | 5/1998 | Hachey |
| 5,774,265 A | 6/1998 | Mathers |
| 5,777,791 A | 7/1998 | Hedblom |
| 5,942,280 A | 8/1999 | Mathers |
| 6,014,595 A | 1/2000 | Kobayashi |
| 7,513,941 B2 | 4/2009 | Frey |
| 8,462,988 B2 | 6/2013 | Boon |
| 8,591,044 B2 | 11/2013 | Budd |
| 8,591,045 B2 | 11/2013 | Budd |
| 9,081,385 B1 | 7/2015 | Ferguson |
| 9,536,425 B1 | 1/2017 | Soltesz |
| 2002/0090492 A1* | 7/2002 | Haunschild ............. E01F 9/619 428/141 |
| 2003/0035927 A1* | 2/2003 | Rice ........................ E01F 9/578 428/143 |
| 2005/0100709 A1* | 5/2005 | Bescup .................... E01F 9/524 428/143 |
| 2005/0158461 A1 | 7/2005 | Bescup |
| 2007/0276599 A1* | 11/2007 | Ogawa .................. G01S 17/931 382/181 |
| 2011/0059295 A1* | 3/2011 | Greer ...................... E01F 9/512 428/149 |
| 2012/0141785 A1* | 6/2012 | Lowrey .................... B05D 7/54 428/339 |
| 2013/0208945 A1 | 8/2013 | Nunn |
| 2014/0011911 A1* | 1/2014 | Hedblom ................ E01F 9/506 523/172 |
| 2016/0012300 A1 | 1/2016 | Tsuruta |
| 2018/0251946 A1* | 9/2018 | Kiel ........................ E01F 9/512 |
| 2019/0271123 A1* | 9/2019 | Dolinar ................ E01C 23/163 |

* cited by examiner

1

PAVEMENT MARKING SYSTEM FOR LANE IDENTIFICATION

CROSS REFERENCE TO RELATED APPLICATIONS

This application is a national stage filing under 35 U.S.C. 371 of PCT/IB2018/051704, filed Mar. 14, 2018, which claims the benefit of Provisional Application No. 62/471,764, filed Mar. 15, 2017. The disclosure of both applications is incorporated by reference in their entirety herein.

TECHNICAL FIELD

The present disclosure relates to a pavement marking system for lane identification.

BACKGROUND

Pavement or road markings (e.g., paints, tapes, and individually mounted articles) guide and direct motorists and pedestrians traveling along roadways and paths. Pavement or road markings can be used on, for example, roads, highways, parking lots, and recreational trails. Typically, pavement markings form stripes, bars, and markings for the delineation of lanes, crosswalks, parking spaces, symbols, legends, and the like.

Paint was a preferred pavement marking for many years. Retroreflective liquid pavement markings typically include retroreflective elements. Retroreflective liquid pavement marking offer significant advantages over paint, such as increased visibility, retroreflectance, improved durability, and temporary and/or removable marking options. Such retroreflective elements are described in, for example, U.S. Pat. Nos. 5,750,191; 5,774,265; 5,942,280; 7,513,941; 8,591,044; 8,591,045; and U.S. Patent Publication Nos. 2005/0100709 and 2005/0158461, all of which are incorporated herein in their entirety. Commercially available retroreflective elements include, for example, All Weather Elements made by 3M Company of St. Paul, Minn. Typically, a retroreflective element includes a core adjacent to numerous glass or glass ceramic beads that are adhered to the outermost surface of core by a binder.

Retroreflective tapes incorporate retroreflective elements durably adhered to a flexible substrate, which in turn is adhered to the roadway to delineate features on the surface such as lanes. Such retroreflective tapes are described in, for example, U.S. Pat. No. 5,777,791A, which is incorporated herein in its entirety. Commercially available pavement marking tapes include, for example, 3M™ Stamark™ High Performance Tape 380I ES and 3M™ Stamark™ All Weather Tape 380AW.

Sensors on vehicles can be made to detect the absence or presence of a pavement marking and its location relative to a vehicle and to the trajectory of a vehicle. These data serve as inputs to advanced driver assistance systems such as lane departure warning systems and lane keeping systems, as well as autonomous driving systems or autopilot functions. In a lane departure warning system, the driver is alerted if the vehicle begins to cross or crosses the pavement markings. In a lane keeping system, the lane detection function serves to trigger the engagement of the steering system of the vehicle to return the vehicle to the lane. In autonomous driving or autopilot systems, detecting the pavement markings is key to keeping the vehicle in the lane and to calculating the future path of the vehicle. Such systems commonly rely on forward-facing cameras that have a fairly narrow field of view, particularly if they are designed for autonomous driving. As a result of this narrow field-of-view, not all of the lanes of traffic may be visible in the field of view of the camera when travelling on multilane roadways, and lane markings designed for human vision do not typically explicitly distinguish one lane from another. Lane markings that explicitly tag lanes should convey this information at all points in the lane marking so as to minimize occlusion by passing vehicles and other obstacles in the roadway. Additionally, lane markings that explicitly tag lanes should do so in a computationally inexpensive manner to minimize computing load on the vehicle computers, and in a manner that is robustly detectable over a wide range of lighting conditions, weather conditions (e.g. dry and wet), and pavement substrates. Lastly, lane markings that explicitly tag lanes should minimize complexity of installation to mitigate potential erroneous labeling.

SUMMARY

The disclosed pavement marking system provides information about the arrangement of the pavement marking to a sensor on a vehicle to identify a particular lane on a roadway. In one embodiment the pavement marking system comprises a sensor, a first pavement marking, and second pavement marking. The first pavement marking comprises a first portion having a first property and a second portion having a second property, different from the first property. The difference between the first property of the first pavement marking and the second property of the first pavement marking provides a first signal. The second pavement marking is spaced from the first pavement marking and comprises a first portion having a first property and a second portion having a second property, different from the first property. The difference between the first property of the second pavement marking and the second property of the second pavement marking provides a second signal. The arrangement of the first signal relative to the second signal correspond to a defined lane.

In one embodiment of the pavement marking system the first portion and second portion of the first pavement marking extends longitudinally along the first pavement marking. In one embodiment of the pavement marking system, the first portion and second portion of the second pavement marking extends longitudinally along the second pavement marking.

In one embodiment of the pavement marking system the first property and second property of the first pavement marking or second pavement marking is one of color, wavelength, or retroreflectivity.

In one embodiment, the first pavement marking further comprises a third portion having a third property, wherein the third property may be one of (i) the same as the first property of the first pavement marking, (ii) the same as the second property of the first pavement marking, or (iii) different from both the first and second properties of the first pavement marking. In one embodiment, the second pavement marking further comprises a third portion having a third property, wherein the third property may be one of (i) the same as the first property of the second pavement marking, (ii) the same as the second property of the second pavement marking, or (iii) different from both the first and second properties of the second pavement marking. In one embodiment, the difference between the first property, second property, and third property of the first pavement marking provides the first signal.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

In one aspect, pavement markings and systems described in the present application may be used in lane keeping and/or lane departure warning systems. In lane keeping, the goal is to automatically control the vehicle so that it stays in the current travel lane, whereas a lane departure warning system uses its lane estimates to assist the human driver and emits an audible or visible warning if there is an unexpected lane change.

In one aspect, the present application is in the field of driver assistance or autonomous vehicles based on computer vision or other sensing techniques perceiving the surrounding of a vehicle, in particular a road vehicle, and processing a signal to generate system-relevant information.

In one aspect, the present inventors sought to improve lane detection by allowing a vehicle to not only detect the existence of a lane but also to identify the lane's position with respect to the roadway. In other words, the methods and systems presently described identify the lateral positioning (e.g., lane) of a roadway by sensing and extracting from the output of the sensor a signal that enables identification of the lane position. The basis for this extraction are differentiating features that correlate to spatial aspects of lanes in a road environment and that are extracted from information derived from output obtained from the sensor. Such sensor may be a camera for image capturing which is arranged somewhere on a vehicle (e.g., windshield, bumper, etc) to sense the environment ahead of and/or around the vehicle.

While currently existing systems are generally successful in identifying the existence of lanes, the existing systems are unable to identify the position of the detected lane with respect to adjacent lanes travelling in the same direction of the vehicle or in opposite direction.

Figure 1:
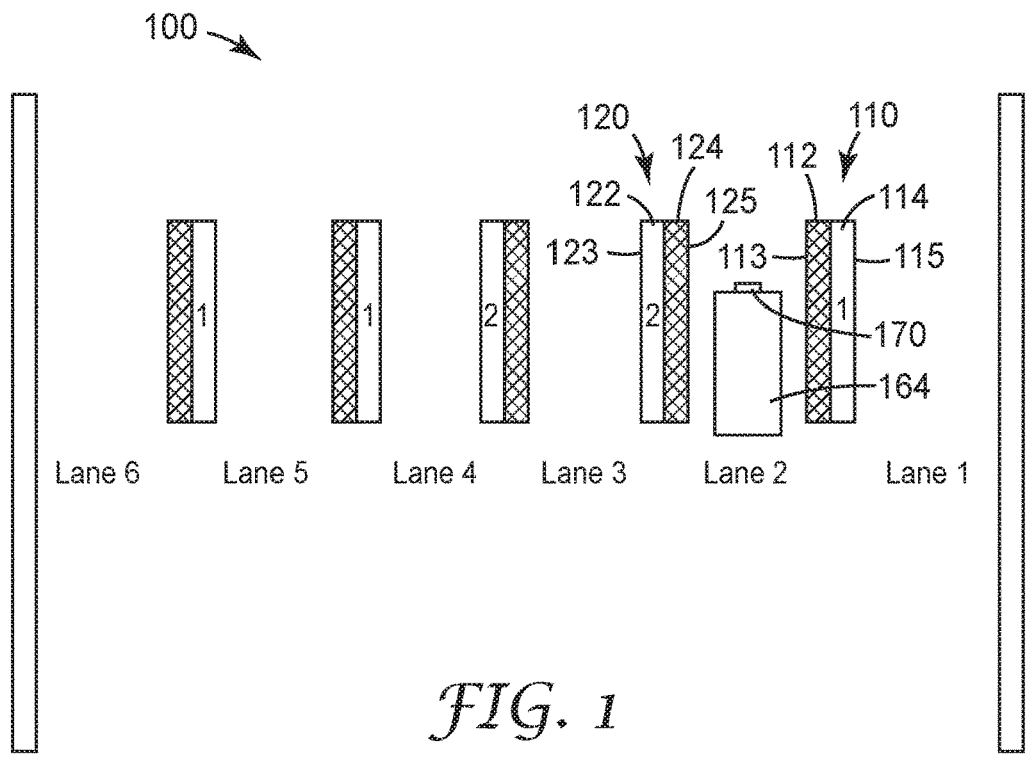
FIG. 1 shows a top view of one embodiment of a pavement marking system.

FIG. 1 shows a top view of one embodiment of a pavement marking system 100. The pavement marking system 100 comprises a sensor 170 placed on a vehicle 164 and at least a first pavement marking 110 and a second pavement marking 120. Each of the first and second pavement marking 110, 120 comprise contrasting portions.

In this embodiment, the first pavement marking 110 extends longitudinally along the direction the vehicle travels and comprises a first portion 112 extending along a first longitudinal side 113 of the pavement marking 110, and a second portion 114 extending along a second longitudinal side 115 of the pavement marking 110. The first portion 112 includes a first property and the second portion 114 includes a second property, different from the first property. The first portion 112 of the first pavement marking 110 relative to the second portion 114 of the first pavement marking 110 provides a first signal to the sensor 170. Specifically, the difference in properties of the first portion and second portion provides the first signal.

The second pavement marking 120 extends longitudinally along the direction the vehicle travels and comprises a first portion 122 extending along a first longitudinal side 123 of the pavement marking 120, and a second portion 124 extending along a second longitudinal side 125 of the pavement marking 120. The first portion 122 includes a first property and the second portion 124 includes a second property, different from the first property. The first portion 122 of the first pavement marking 120 relative to the second portion 124 of the first pavement marking 120 provides a second signal to the sensor 170. The arrangement of the first signal relative to the second signal correspond to a defined lane. Specifically, the difference in properties of the first portion and second portion provides the first signal.

In one embodiment, the first signal and second signal can be read by the sensor 170 as a pattern of difference in luminance in a horizontal trace of pixel intensities in the collected image data at some range of wavelengths. For example, this pattern might be a result of a difference in color or a difference in retroreflectivity. As shown in FIG. 1, the first and second pavement makings each include first and second portions of different color. Specifically, the different colors are black and white.

For the first pavement marking 110, the first portion 112 of the first pavement marking 110 is black and the second portion 114 of the first pavement marking 110 is white. The relative placement of black relative to white will provide to the sensor 170 a first signal. In this embodiment, black is on the left and white is on the right and the first signal is interpreted as a "1."

For the second pavement marking 120, the first portion 122 of the first pavement marking 120 is white and the second portion 124 of the first pavement marking 120 is black. The relative placement of black relative to white will provide to the sensor 170 a second signal. In this embodiment, black is on the right and white is on the left and the second signal is interpreted as a "2."

The sensor sees the arrangement of the first signal, as "1" on the right side of the sensor in this embodiment, and the second signal, a "2" on the left side of the sensor, and therefore assigns the car to the second lane furthest right the right side of the pavement edge.

It is understood from FIG. 1 that interchanging location of the first portion and second portions of the pavement marking tape will result in further signals that are either a "1" or a "2." Therefore, as shown in FIG. 1, reading from left to right a 1-1 read is lane 5, a 1-2 read is lane 4, a 2-2 read is lane 3, and as described above the 2-1 read is lane 2. It is understood the continuously extending furthest pavement marking relative to the discontinuous pavement marking will indicate lane 1 and lane 6, respectively.

Figure 2:
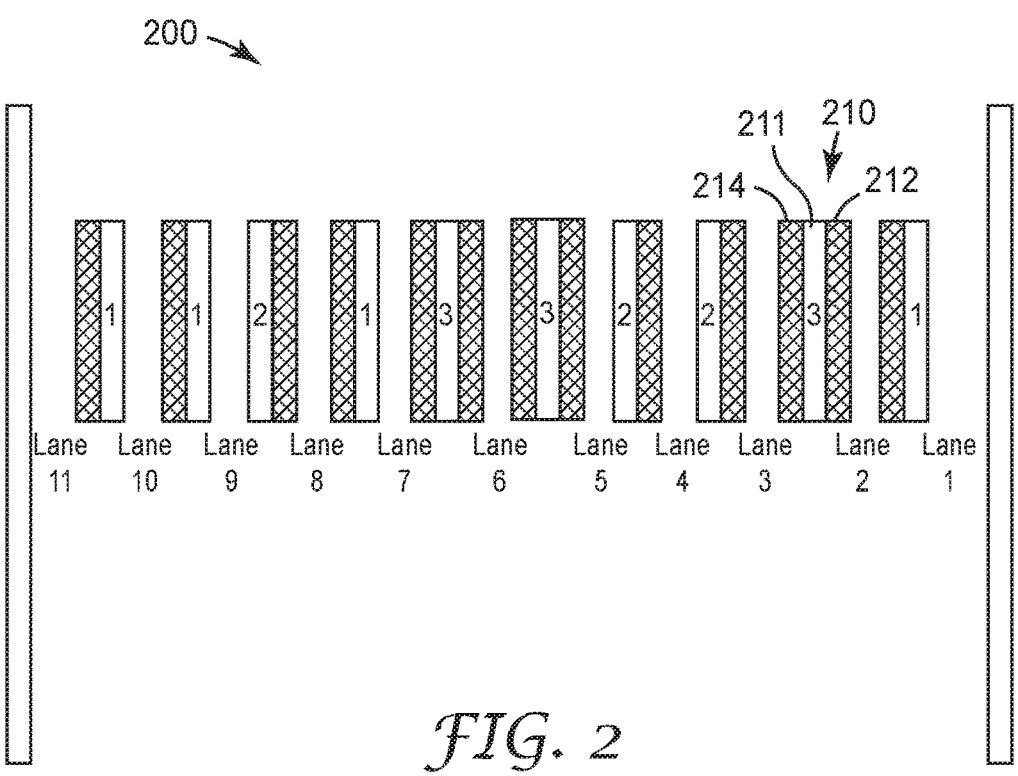
FIG. 2 shows a top view of a second embodiment of a pavement marking system.

FIG. 2 shows a top view of a second embodiment of a pavement marking system 200 substantially similar to the system shown in FIG. 1. However, in this embodiment, at least one pavement marking 210 includes a first portion 212, a second portion 214, and a third portion 211. Similar to the arrangement as described above with respect to FIG. 1, relative placement of the first portion 212 relative to the second portion 214 will assign as a signal that is either a 1 or a 2. In addition, in the embodiment shown in FIG. 2, the pavement marking with the first portion 212, second portion 214 and third portion 211 is a "3."

It is understood from FIG. 2 that interchanging location of the first portion and second portions, and third portion in some instances of the pavement marking tape will result in further signals that are either a "1," "2," or a "3." Therefore, as shown in FIG. 2, reading from left to right a 1-1 read is lane 10, a 1-2 read is lane 9, a 2-1 read is lane 8, a 1-3 read is lane 7, a 3-3 read is lane 6, a 3-2 read is lane 5, a 2-2 read is lane 4, a 2-3 read is lane 3, and a 3-1 read is lane 2. It is understood the continuously extending furthest pavement marking relative to the discontinuous pavement marking will indicate lane 1 and lane 11, respectively.

Figure 3:
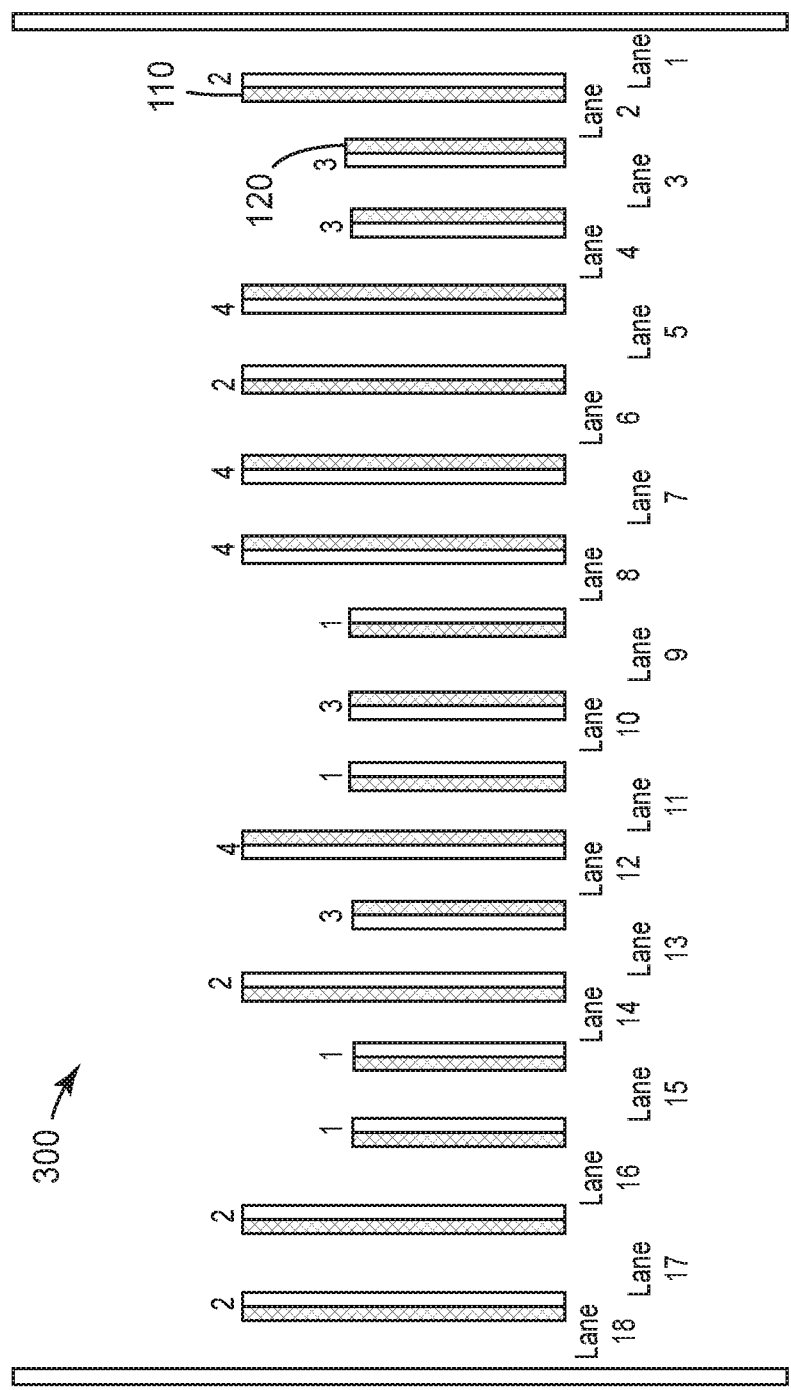
FIG. 3 shows a top view of a third embodiment of a pavement marking system.

FIG. 3 shows a top view of a third embodiment of a pavement marking system 300 substantially similar to the system shown in FIG. 1. However, in this embodiment, first and second pavement marking 110, 120 are of different lengths. As described above relative placement of the first portion relative to the second portion, along with the length information will assign as a signal that is either a "1," "2," "3," or "4," as shown in FIG. 3.

Therefore, as shown in FIG. 3, reading from left to right a 2-2 read is lane 17, a 2-1 read is lane 16, a 1-1 read is lane 15, a 1-2 read is lane 14, a 2-3 read is lane 13, a 3-4 read is lane 12, a 4-1 read is lane 11, a 1-3 read is lane 10, a 3-1 read is lane 9, a 1-4 read is lane 8, a 4-4 read is lane 7, a 4-2 read is lane 6, a 2-4 read is lane 5, a 4-3 read is lane 4, a 3-3 read is lane 3, and a 3-2 read is lane 2. It is understood the continuously extending furthest pavement marking relative to the discontinuous pavement marking will indicate lane 1 and lane 18, respectively.

The pavement marking may be any construction to provide the contrast needed to distinguish the first portion from the second portion (and third portion, if included). For example, the pavement marking may have contrasting colors or differing levels of retroreflectivity. The pavement marking may be painted, may be a tape, or may include a portion that is painted on the roadway and a portion that is tape. The pavement marking may include retroreflective element to control the retroreflectivity at one or both portions of the pavement marking (or the third portion, if included).

For ease of installation, in one embodiment, the pavement marking comprises a single substrate that is a tape to be adhesively secured to a roadway.

The sensor 170 is able to read the pavement marking image. For example, the sensor may be a camera or use LiDAR. The sensor may further include a processor, or may work with a processor to interpret the information received.

In one embodiment, the present application relates to a method for detecting lane position within a roadway. The present method relies on detection and identification of differentiating features extracted from a signal. For the present invention it is not particularly relevant in which way such differentiating features are extracted and there is a plurality of ways known from the state of the art. For further explanation a method similar to that described in U.S. Pat. No. 4,970,653 Menne) may be used. In the method of Kenue, a vehicle is mounted with at least one camera for viewing a scene ahead of the vehicle. The camera is used to generate a digital image of the scene (output) and further processing steps include normalizing the image, defining a search area in the image, and searching lane markers (pavement markings) in the search area of the image. In one embodiment, the pavement markings of the present application comprise a first portion and a second portion, wherein the first portion of the first pavement marking relative to the second portion of the first pavement marking provides a first signal which is detected on the output of the reader. In one exemplary method, after detection of the pavement marking from the search area of the image is accomplished, the system further detects the signal provided by the first and second portions of the pavement marking. In some embodiments, detection of the signal is successful when above a predetermined threshold. The system then uses information provided by the signal to determine lane position.

In some embodiments, the first portion of the pavement marking has a first feature and the second portion has a second feature, different from the first feature. In some embodiments, the first feature is a first color and the second feature is a second color. In some embodiments the first color is black and the second color is white. The differentiating features are detected either by the sensor or on the output of the sensor and the signal provided by the first portion relative to the second portion relates to increased contrast of the detected pavement marking on the image captured by the camera. Exemplary pavement marking constructions suitable in the present application include "3M™ Stamark™ Durable All Weather Contrast Pavement Marking Tape Series 380AW-5" commercially available from 3M Company, St. Paul, Minn.

In yet another exemplary embodiment, the first feature and the second feature are retroreflectivity or brightness. In some embodiments, the first portion has lower retroreflectivity (Ra) than the second portion. This change in retroreflectivity results in increased contrast on the captured image.

Other exemplary methods to extract differentiating features from the output of a sensor are described in U.S. Pat. No. 9,081,385 (Ferguson et al.), and U.S. Pat. No. 8,462,988 (Boon), both incorporated herein by reference in their entireties.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

What is claimed is:

1. A pavement marking system comprising:
   a sensor;
   a first pavement marking comprising:
      a first portion having a first property; and
      a second portion having a second property, different from the first property;
      wherein the difference between the first property of the first pavement marking and the second property of the first pavement marking provides a first signal;
   a second pavement marking and spaced from the first pavement marking comprising:
      a first portion having a first property; and
      a second portion having a second property, different from the first property;
      wherein the difference between the first property of the second pavement marking and the second property of the second pavement marking provides a second signal;
   wherein the arrangement of the first signal relative to the second signal correspond to a defined lane.

2. The pavement marking system of claim 1, wherein the first portion and second portion of the first pavement marking extends longitudinally along the first pavement marking.

3. The pavement marking system of claim 1, wherein the first portion and second portion of the second pavement marking extends longitudinally along the second pavement marking.

4. The pavement marking system of claim 1, wherein the first property and second property of the first pavement marking or second pavement marking is one of color, wavelength, or retroreflectivity.

5. The pavement marking system of claim 1, wherein the first portion of the first pavement marking is a first color and the second portion of the first pavement marking is a second color, different from the first color.

6. The pavement marking system of claim 1, wherein the first portion of the second pavement marking is a first color and the second portion of the second pavement marking is a second color, different from the first color.

7. The pavement marking system of claim 1, wherein the first portion of the first pavement marking has a first retroreflectivity and the second portion of the first pavement marking has a second retroreflectivity, different from the first retroreflectivity.

8. The pavement marking system of claim 1, wherein the first portion of the second pavement marking has a first retroreflectivity and the second portion of the second pavement marking has a second retroreflectivity, different from the first retroreflectivity.

9. The pavement marking system of claim 1, wherein a first pavement marking further comprises a third portion having a third property, wherein the third property may be one of (i) the same as the first property of the first pavement marking, (ii) the same as the second property of the first pavement marking, or (iii) different from both the first and second properties of the first pavement marking.

10. The pavement marking system of claim 1, wherein a second pavement marking further comprises a third portion having a third property, wherein the third property may be one of (i) the same as the first property of the second pavement marking, (ii) the same as the second property of the second pavement marking, or (iii) different from both the first and second properties of the second pavement marking.

11. The pavement marking system of claim 9, wherein the difference between the first property, second property, and third property of the first pavement marking provides the first signal.

12. The pavement marking system of claim 1, wherein sensor reads the contrast in color between the first portion of the first pavement marking and the second portion of the first pavement marking to read the first signal.

13. The pavement marking system of claim 1, wherein sensor reads the light return between the first portion of the first pavement marking and the second portion of the first pavement marking to read the first signal.

14. The pavement marking system of claim 1, wherein sensor reads the contrast in color between the first portion of the second pavement marking and the second portion of the second pavement marking to read the second signal.

15. The pavement marking system of claim 1, wherein sensor reads the light return between the first portion of the second pavement marking and the second portion of the second pavement marking to read the second signal.

16. The pavement marking system of claim 1, wherein the first pavement marking is a continuous substrate comprising the first portion and second portion.

17. The pavement marking system of claim 1, wherein the first portion of the first pavement marking is white and the second portion of the first pavement marking is black.

18. The pavement marking system of claim 1, wherein the first portion of the second pavement marking is white and the second portion of the second pavement marking is black.

19. The pavement marking system of claim 1, wherein a length of the first pavement marking provides a first longitudinal signal to the sensor, and wherein a length of the second pavement marking provides a second longitudinal signal to the sensor.

20. The pavement marking of claim 19, wherein the arrangement of the longitudinal signal relative to the first or second signal correspond to a defined lane.

* * * * *